Oct. 30, 1962 HIDEO IIDA 3,060,875
REVERSE STITCHING DEVICE COMBINED WITH NEEDLE POSITION
CHANGING MECHANISM FOR ZIGZAG SEWING MACHINE
Filed Oct. 28, 1958 5 Sheets-Sheet 1

Oct. 30, 1962  HIDEO IIDA  3,060,875
REVERSE STITCHING DEVICE COMBINED WITH NEEDLE POSITION
CHANGING MECHANISM FOR ZIGZAG SEWING MACHINE
Filed Oct. 28, 1958  5 Sheets-Sheet 2
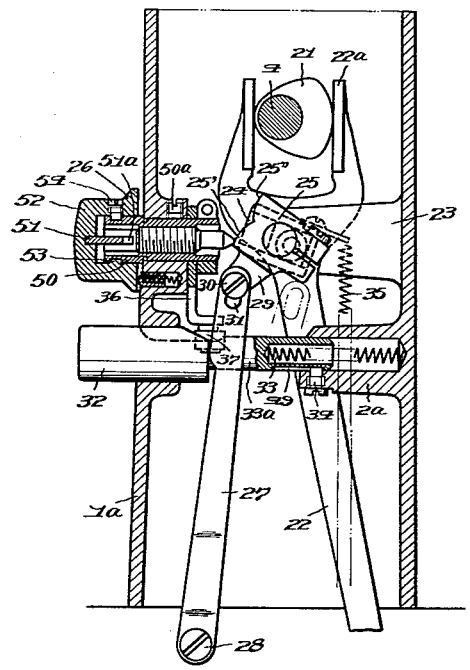
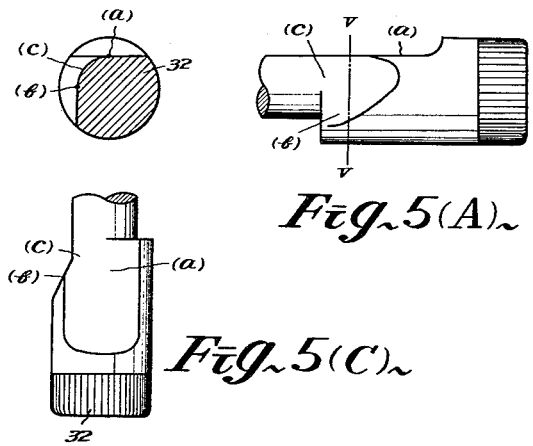
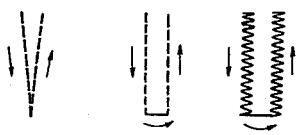
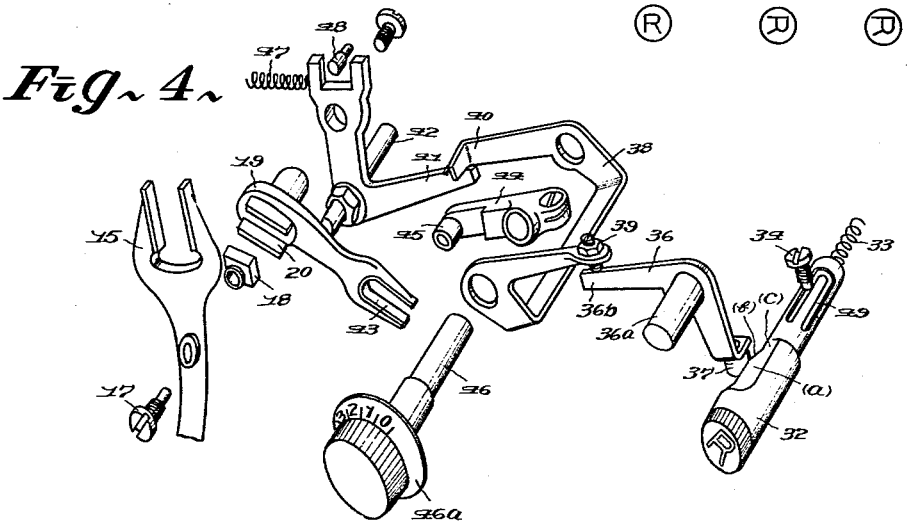

Fig-15.
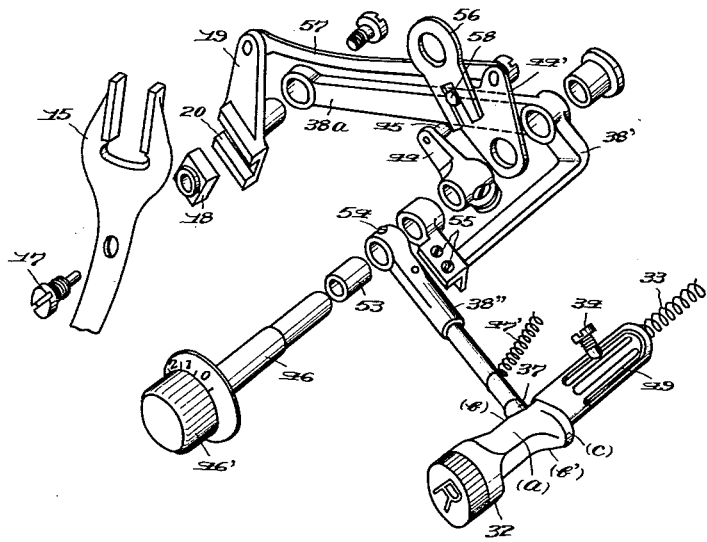
Fig-16(B). Fig-16(A).
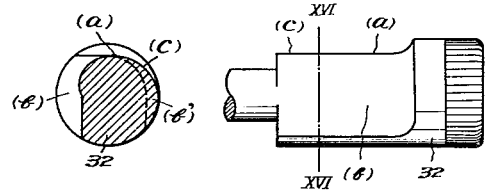
Fig-17.
Fig-16(C).
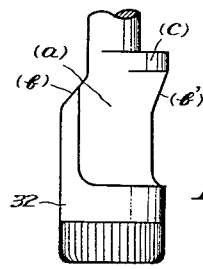
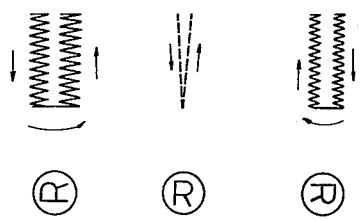

United States Patent Office 3,060,875
Patented Oct. 30, 1962

3,060,875
REVERSE STITCHING DEVICE COMBINED WITH NEEDLE POSITION CHANGING MECHANISM FOR ZIGZAG SEWING MACHINE
Hideo Iida, Hamamatsu-shi, Japan, assignor to Prince Jidosha Kogyo Kabushiki Kaisha, a joint-stock company of Japan
Filed Oct. 28, 1958, Ser. No. 770,057
Claims priority, application Japan Oct. 29, 1957
5 Claims. (Cl. 112—158)

This invention relates generally to sewing machines and more particularly to an improved reverse stitching device combined with needle position changing mechanism for a zigzag sewing machine.

An essential object of this invention is to provide a reverse stitching device for a zigzag sewing machine, which can carry out simultaneously a change of work feeding to reverse stitching and a change of needle position by mere operation of only one reverse controller, for example, a single push button.

Another object of this invention is to provide a reverse stitching device for a zigzag sewing machine, which is particularly effective for stitching button hole seams.

Still another object of this invention is to provide a reverse stitching device for a zigzag sewing machine, which can carry out simultaneously three types of operations, that is, a needle position change, a change of work-feeding to reverse stitching. The last mentioned changes are accomplished by use of a single reverse controller, thus permitting the omission of the conventional needle position changing lever or knob, simplifying the construction and operation of the sewing machine. The invention improves the practical value of the conventional domestic zigzag sewing machine.

The invention comprises the devices, combination and arrangement of parts hereinafter set forth in connection with the accompanying drawing from which the construction and operation of a preferred embodiment of this invention and the advantages attained thereby will be readily understood by those skilled in the art.

Referring to the drawing, in which same or similar parts are indicated by the same references and in which:

FIG. 3 is a sectional side elevation view of an upright pedestal of the machine in FIG. 1;

FIG. 4 is a perspective exploded view of a pushbutton actuated mechanism, used in the device of this invention, in which the various members of the mechanism are shown disjointed;

FIG. 5(A) is an enlarged side view of the operating pushbutton in FIG. 4;

FIG. 5(B) is a sectional view taken along the line V—V of FIG. 5(A);

FIG. 5(C) is a plan view of the button in FIG. 5(A);

FIG. 5(D) is a diagram illustrating various kinds of stitched seams obtained by use of the mechanism in FIG. 4;

FIG. 15 is a perspective exploded view of a modification of the pushbutton actuated mechanism in FIG. 4;

FIG. 16(A) is an enlarged side view of the pushbutton in FIG. 15;

FIG. 16(B) is a sectional view taken along the line XVI—XVI in FIG. 15(A);

FIG. 16(C) is a plan view of the pushbutton in FIG. 15(A);

FIG. 17 is a diagram illustrating various kinds of stitched seams obtained by use of the mechanism in FIGS. 15 and 16(A), (B), (C).

Figure 1:
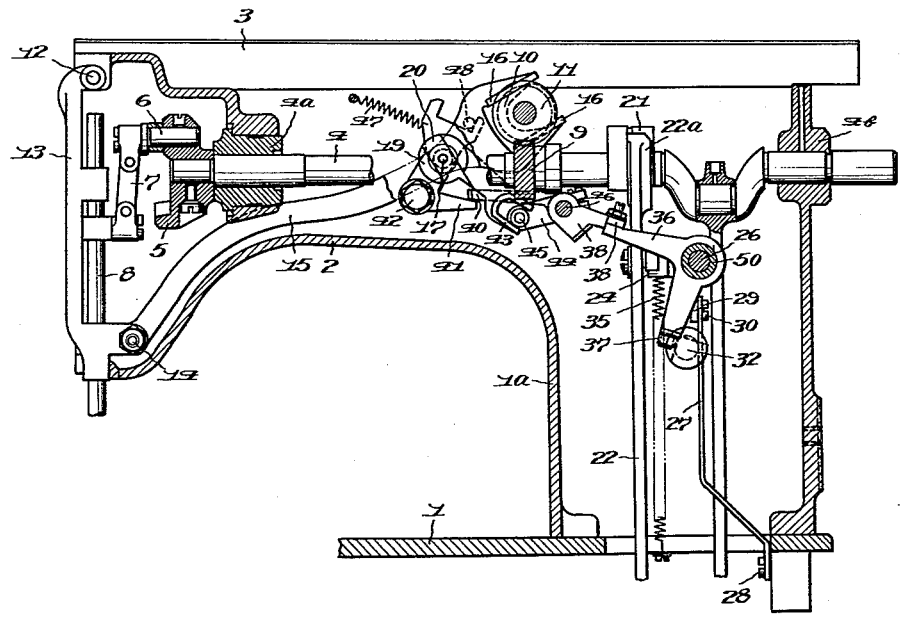
FIG. 1 is a fragmentary elevation view partly in section of a sewing machine provided with one embodiment of this invention.
Figure 2:
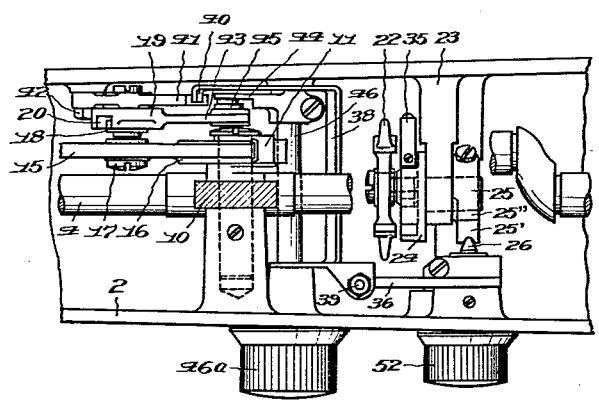
FIG. 2 is a fragmentary plan view of the essential middle portion of the embodiment shown in FIG. 1.

Referring to FIGS. 1–3, in which a zigzag sewing machine comprises a machine bed plate 1, a bracket arm 2 of an upright pedestal or standard 1a mounted on the bed plate, and an upper cover 3 covering the bracket arm. The bracket arm is provided, at its left side, with a face plate, not shown, and, the standard or pedestal has on its right side thereof a hand wheel, not shown. The various accessory mechanisms arranged under the bed plate 1 and bracket arm 2 are not shown since they have no relation to the main device of this invention.

The detailed construction of the essential mechanism of this invention will now be described. A main driving shaft 4 is rotatably supported by horizontal bearings 4a and 4b.

A vertically disposed needle bar 8 is made to reciprocate up and down by the shaft 4 through a counterbalanced crank disk 5 connected to shaft, a crank pin 6 mounted on the disc extending longitudinally therefrom and a connecting link 7 connected to the pin 6 and the needle bar.

A gear 10 is rotatably driven by a spiral gear 9 attached to the shaft 4 whereby a cam 11 fixed to the shaft of the gear 10 is rotated. The needle bar 8 is journaled for longitudinal reciprocation in a laterally swinging frame 13 pivotally hung at its upper end on a fulcrum pin 12 attached to the bracket arm 2. The frame 13 is provided, at its lower end, with a stud screw 14. A swinging rod 15 having a free end provided with forked arms 16 embracing the cam 11 is pivotally supported on the stud screw 14 and is made to oscillate about the stud screw 14 by rotation of the cam 11. On the other hand, upon rotation of the cam 11, a slide block 18 supported rotatably by a stud screw 17 attached to the swinging rod 15 is made to slide in a guide slot 20 formed on the side of a zigzag guide bracket 19. The slide block 18 is adapted to reciprocate to the right and the left in the guide slot 20 to carry out conventional zigzag sewing. The manner of this zigzag sewing will be described as follows in connection with the diagrammatic views of feed controlling connections in FIGS. 6–9.

The guide bracket 19 is provided with forked arms 43 which are in contact with a roller 45 supported by an adjusting link 44 which is arranged so as to be adjusted by a zigzag operating shaft 46 passing through the link 44 and fixed thereto.

Figure 6:
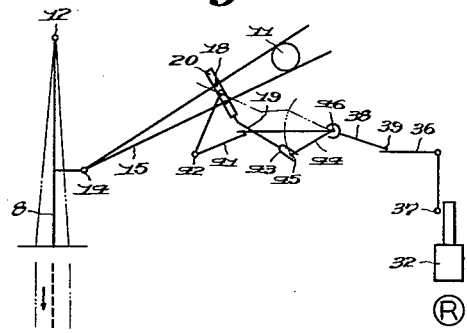
FIG. 6–FIG. 9 are diagrammatic representations of the feed controlling connections for describing the operation of the embodiment of the invention illustrated in FIGS. 1–5.
Figure 7:
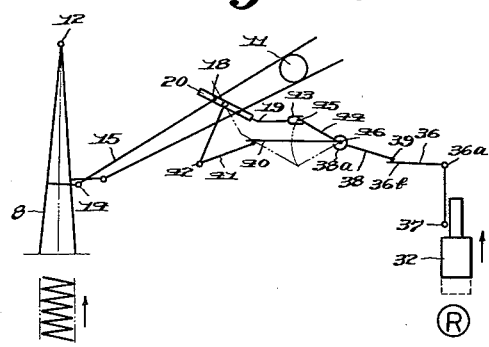

The zigzag amplitude can be conventionally adjusted, as will be understood from FIGS. 6 and 7, by angularly rotating the zigzag operating shaft 46 to rotate the link 44 and thus inclining or angularly rotating the zigzag guide bracket 19 through the forked arms 43.

Figure 8:
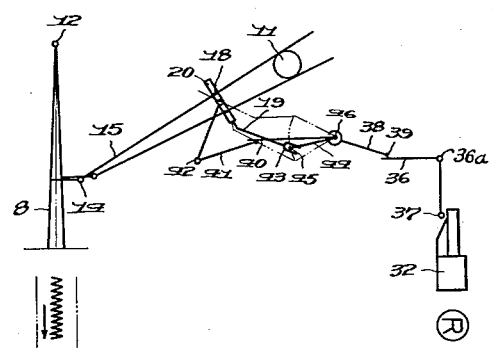

When the connecting mechanism is adjusted to such states or conditions as shown in FIGS. 6–9, straightaway stitching, zigzag stitching of a large amplitude, and zigzag stitching of a small amplitude as shown, respectively, in the left lower part of FIGS. 6, 7 and 8 are carried out.

A cam 21 embraced by the forked arms 22a of a forked rod 22 which is pivotally supported for rocking movement in a manner similar to the swinging rod 15. The feed controlling mechanism, as shown clearly in FIGS. 2 and 3, consists of the cam 21 and the forked rod 22, a bearing support 23 attached to the upright standard 1a, a feed controlling guide bracket 24, a feed-direction controlling cam 25, and a feed controlling screw 26.

This invention relates to an improvement of the above-mentioned feed controlling mechanism.

According to this invention, this mechanism comprises a connecting lever 27 pivotally connected to the bed plate 1 at a pivotal shaft 28, an arm 29 for adjusting the feed-direction controlling cam 25, a guide pin 30 attached to the arm 29. This pin is engaged in an elongated guide slot 31 formed at the free end of the lever 27 and a push button 32 for reverse stitching. The push button is slidably supported so as to be able to push directly on said lever. A return spring 33 biases the push button 32 to a withdrawn position and acts against the force of the push button when depressed and is held in a sleeve 33a which is slidably supported in a hollow arm 2a of the standard 1a. A stop pin 34 is provided for guiding and protecting the sleeve 33a from slipping out of position. The pin 34 is engaged in a guide slot 49 of the sleeve.

When the pushbutton 32 is in a withdrawn position as shown in FIGS. 3 and 6, the lever 27 takes the position as shown in FIG. 3 and the cam surface 25' of the cam 25 is in contact with the feed controlling screw 26.

However, when the pushbutton 32 is pushed in, the arm 29 is turned counterclockwise, whereby the feed-direction controlling cam 25 is also turned counterclockwise so as to be brought in contact, at its cam surface 25'', with the feed controlling screw 26, thus causing the back stitching. The feed-direction controlling cam 25 is normally biased in a clockwise direction by a spring 35 to take the position corresponding to a forward stitching position.

As shown in FIGS. 4 and 5, the pushbutton 32 of this invention has a special cam surface consisting of a horizontally cut flat surface (a), a slanted surface (b), and an arcuate surface (c) for connecting said surfaces (a) and (b). The cam surface (a) is normally in contact with a roller 37.

Figure 9:
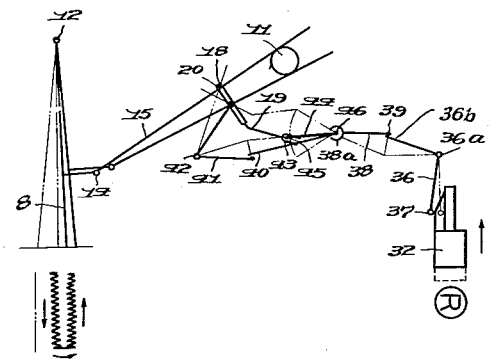

Referring to FIGS. 4, 5 and 7, when the pushbutton 32 is pushed without rotating it first, that is, under the state as shown by R in FIG. 7, a roller 37 is brought into contact with the surface (a). Accordingly, the roller 37 is not affected in any manner. However, when the pushbutton 32 is pushed, after having been turned or rotated by 90°, to the state or position as shown in FIG. 4 or FIG. 9, the roller 37 is brought in contact with the slant surface (b), whereby the roller 37 is displaced along said slant surface (b) and pushes a lever 36. Consequently, the lever 36 is turned clockwise around a pivotal shaft 36a, whereby the other end 36b of the lever 36 pushes an adjustable screw 39 provided at one end of a lever 38 pivoted about pivotal shaft 46, functioning as a zigzag operator shaft as hereafter described, so as to make the lever 38 turn counterclockwise. Upon counterclockwise rotation of the lever 38, its other end 40, which is free, is brought in contact with one end of a needle position changing two-arm lever 41 and it pushes against this arm 41, whereby the lever 41 is rotated clockwise around a pivotal shaft 42 and it displaces the zigzag guide bracket 19 resulting in a change of the needle position.

One end of the zigzag guide bracket 19 has forked arms 43 embracing a roller 45 which is supported by a zigzag adjusting link 44. This link 44 is arranged so as to be adjusted by the zigzag operating shaft 46. The needle position changing two-arm lever 41 is held in engagement with the end 40 of the lever 38 by a spring 47. The swing amplitude of the two-arm lever is limited by a stop 48 fixed to the bracket arm 2.

As described above, the needle position changing mechanism is made to co-operate with the conventional back stitching mechanism. That is to say, the left side stitching of a button hole can be effected by forward stitching after turning of the push button 32 to the right as shown in FIG. 8 and a suitable adjustment of zigzag width and stitch length. When the push button is pushed to the position as shown in FIG. 9 after said left side stitching of a suitable length, the needle position is converted to the right side and needle feeding is reversed, thereby the right side stitching of the button hole is carried out. Lastly, if the push button is released, the needle position is restored and stitching of the button hole is completed. In such a manner as described above, button hole stitching can be easily completed by one operation of the push button.

The construction of the pitch-length adjusting mechanism will now be described in detail.

The feed controlling screw 26 is screwed in a stationary guide sleeve 50 so as to be displaced in its axial direction said sleeve 50 is fixed to the bracket arm 2 by a set screw 50a screwed in said arm.

A knob 52 is provided with a guide piece 51 attached thereto at its inner center. This guide piece is engaged with an axially elongated slot 51a provided on the head of the feed controlling screw 26.

The knob 52 is rotatably engaged with the sleeve 50 by screwing a stud screw 54 into a ring slot 53 made around the sleeve 50, so the knob 52 is made to rotate around the sleeve 50 without slipping out of position. The feed controlling screw 26 is displaced inward in its axial direction through the guide piece 51 upon rotation of the knob 52. Upon inward displacement of the screw 26, the cam 25 is turned counterclockwise against the force of the spring 35 while in contact with the head of the screw 26, whereby the stitch length or amplitude is changed. This changing will be understood from the following description. Since the feed controlling cam 25 is fixed to the shaft of the feed controlling guide bracket 24, the inclination of the guide slot of the guide bracket 24 is varied by rotation of the cam 25, thereby work feeding, that is to say, stitch length can be adjusted in the same principle as the zigzag guide bracket 19, as in the case of the conventional mechanism which is so-called four-motion feed mechanism consisting of a feed advance rock shaft, a feed lift rock shaft, a feed bar and a feed dog as in the U.S. Patent Nos. 1,341,388 and 2,024,434. On the other hand, when the cam 25 is reversed, by pushing of the push button 32, the guide bracket 24 is reversely turned and the reverse feeding is carried out. Furthermore, when the feed controlling knob 52 is sufficiently rotated in such a manner that the end of the screw 26 is brought in contact with the concave base of cam 25, the stitch length becomes zero and work feeding stops.

Figure 10:
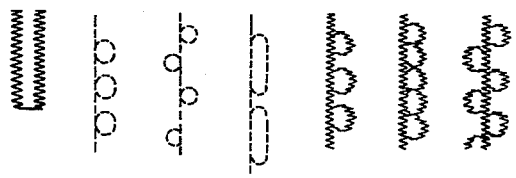
FIG. 10 is a diagram illustrative of the various kinds of stitched seams obtained by a sewing machine provided with the device of this invention.

According to this invention, as will be understood from the above description, since the reverse stitching and needle position conversion can be simultaneously carried out, stitching of any button hole can be efficiently and favourably attained by a very simple operation. Of course, such various kinds of seams as shown in FIG. 10 besides the button hole seams can be effectively stitched.

In the above-mentioned mechanism, the straightaway stitching and zigzag stitching can be actuated by mere operation of the knob 46a of the shaft 46, as in conventional operation. Conventional reverse stitching can be attained by pushing the pushbutton 32 to the position shown in FIG. 7 and the reverse stitching and needle position conversion can be simultaneously carried out by pushing the pushbutton after turning thereof by an angle, for instance of 90° as shown in FIG. 9.

In the present invention, the above-illustrated pushbutton 32 and link mechanism may be modified as shown in FIGS. 11–16.

In the example of the pushbutton 32 and link mechanism cooperative therewith in FIG. 15, the link mechanism (36, 38, 41) in FIG. 4 is replaced by one needle position changing bracket 38' and a rod 38". The relative angle between the bracket 38' and rod 38" can be adjusted by adjusting screws 55 screwed in the bracket 38' so as to be in contact with the rod 38" and then by fixing the rod 38" to the bushing 53 by a set screw 54.

A pin 45 of the zigzag adjusting arm 44 and a pin 58 of a lever 44' are engaged in the forked arms of a lever 56 which is pivotally connected to the bracket arm 2. The arm 44 is fixed to the zigzag operating shaft 46 and the lever 44' is pivotally supported by the shaft 46, whereby the turning angle or rotation of the arm 44 is transmitted, with proportionate reductions, to the lever 44' and in accordance therewith determining the turning angle of the zigzag guide bracket 19.

The arm 44, link 57, bracket 19 and lever 38a form a kind of parallelogram. In the mechanism in FIG. 15, as shown in FIGS. 11–14, the forked lever 56 and lever 44' may be omitted by direct connection of the link 57 with the zigzag adjusting arm 44.

In FIG. 15 and more particularly in FIG. 16 is shown a modification of the pushbutton 32, in which the cam surface consisting of a concave surface (b), a slant surface (a), a peripheral surface (c), and a rear flat cut surface (b') is formed so that the change of the needle position to any position may be effectuated by mere rotation of the pushbutton 32. Zigzag seams suitable for two kinds of large and small button holes may be stitched by pushing the pushbutton 32 inwardly after turning it to the right or to the left.

Figure 11:
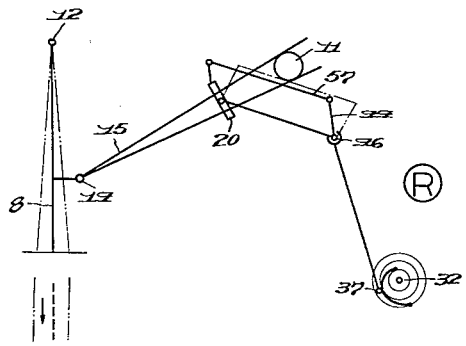
FIG. 11–FIG. 14 are diagrammatic representations of the feed controlling connections for describing the operation of the embodiment illustrated in FIGS. 15 and 16.
Figure 12:
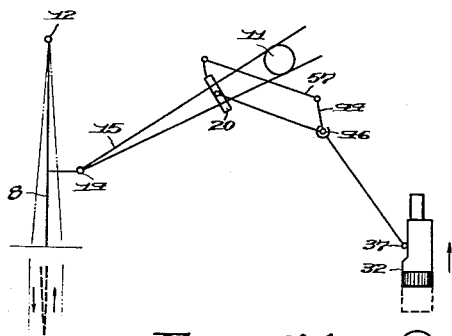
Figure 13:
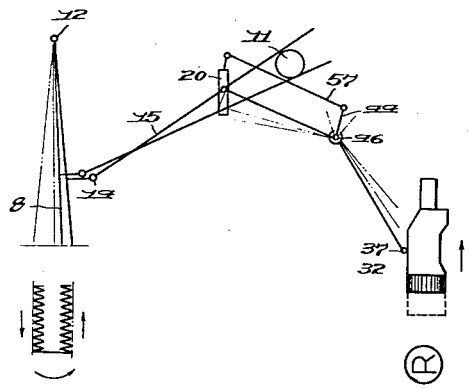
Figure 14:
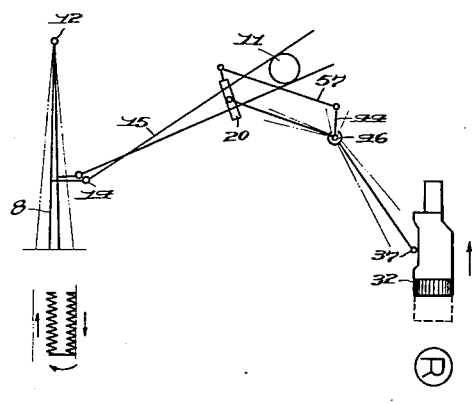

The operation of the above-mentioned modified pushbutton and link mechanism will be described as follows in connection with the feed controlling connection diagrams in FIGS. 11–14. FIG. 11 shows the state or condition of the mechanism of the invention for straightaway stitching, in which the needle position is a center position. FIG. 12 shows a condition in which the straightaway stitching of FIG. 11 is changed to reverse stitching by pushing the pushbutton 32. FIG. 13 illustrates a condition in which the zigzag forward stitching at the left side is carried out by turning the pushbutton 32 to the left and then the stitching is changed to reverse zigzag stitching at the right side by pushing the pushbutton. FIG. 14 shows a condition in which zigzag forward stitching at the right side is carried out by turning of the pushbutton 32 to the right and then the stitching is changed to reverse zigzag stitching at the center position of the needle by pushing said pushbutton 32.

According to the embodiment of the pushbutton illustrated in FIGS. 15 and 16, the needle position can be changed by mere turning of the pushbutton 32 without necessitating the conventional needle position control lever or knob. Furthermore, the needle position change as well as reverse stitching can be simultaneously carried out by pushing only one pushbutton after rotating to the left or the right, whereby zigzag stitching for two kinds, large and small, button holes can be made possible, as shown exaggeratedly in FIG. 17.

Moreover, the mechanism can be simplified and operation is made accurate by arranging the pivotal shaft of the needle position changing arm and the zigzag amplitude regulating shaft in the same axis, and turning angle of the zigzag amplitude regulating knob 46' can be selected to larger degree in comparison with the turning angle of the zigzag guide bracket 19 by providing a mechanism which transmits the turning angle of the zigzag adjusting arm 44, with reduction proportionate to the lever 44' being in the same axis as said arm through a forked lever 56.

While I have described particular embodiments of my invention, it will, of course, be understood that I do not wish my invention to be limited thereto, since many modifications may be made and I, therefore, contemplate by the appended claims to cover all such modifications as fall within the true spirit and scope of my invention.

What I claim is:

1. In a zigzag sewing machine, in combination, reverse stitching mechanism comprising a feed-direction control member operable to an operative position for controlling work-feeding in a forward direction and another operative position for controlling work-feeding in a reverse direction, another mechanism operable to cause the sewing machine to alternatively sew a straight stitch and a zigzag stitch, means cooperative with both the reverse stitching mechanism and the other mechanism including a single pushbutton control and permanent member of the sewing machine operable alternatively to operative positions to simultaneously or alternatively initiate reverse stitching and zigzag stitching, said last mentioned means including means operably connecting the feed-control member and the pushbutton, said pushbutton being operable to position the feed-control member in its reverse feed-control position.

2. In a zigzag sewing machine, in combination, feed mechanism including reverse stitching mechanism comprising a feed-direction control member operable to an operative position for controlling work-feeding in a forward direction and another operative position for controlling work-feeding in a reverse direction, another mechanism operable to cause the sewing machine to alternatively sew a straight stitch and zigzag stitch, means cooperative with both the reverse stitching mechanism and the other mechanism including a single pushbutton control and permanent member of the sewing machine operable alternatively to operative positions to simultaneously or alternatively initiate reverse stitching and zigzag stitching, said last-mentioned means including means operably connecting the feed-control member and the pushbutton, said pushbutton being operable to a given operative position to position the feed-control member in its reverse feed-control position, and means automatically restoring said feed-direction control member to its operative position for controlling forward feeding when the pushbutton is not in said given position.

3. In a zigzag sewing machine, in combination, reverse stitching mechanism comprising a feed-direction control member operable to an operative position for controlling work-feeding in a forward direction and another operative position for controlling work-feeding in a reverse direction, another mechanism operable to cause the sewing machine to alternatively sew a straight stitch and a zigzag stitch, means cooperative with both the reverse stitching mechanism and the other mechanism including a single pushbutton control and permanent member of the sewing machine selectively operable to operative positions in simultaneously or alternatively initiate reverse stitching and zigzag stitching, said last-mentioned means including means operably connecting the feed-control member and the pushbutton, said pushbutton being operable to a given position the feed-control member in its reverse feed control position, means automatically restoring said feed-direction control member to its operative position for controlling forward feeding when the pushbutton is not in said given position and means cooperative with the feed mechanism and said other mechanism to adjustably vary the width of the zigzag stitching.

4. In a zigzag sewing machine, in combination, reverse stitching mechanism comprising a feed-direction control member operable to an operative position for controlling work-feeding in a forward direction and another operative position for controlling work-feeding in a reverse direction, another mechanism operable to cause the sewing machine to alternatively sew a straight stitch and a zigzag stitch, means cooperative with both the reverse stitching mechanism and the other mechanism including a single pushbutton control operable to operative positions to simultaneously or alternatively initiate reverse stitching and straight or zigzag stitching, said last-mentioned means including means operably connecting the feed-control member and the pushbutton, and said pushbutton having a surface effective to position the feed-control member in its reverse feed-control position upon actuation of said pushbutton and having other surfaces positionable selectively in a position for effectively causing said sewing machine to sew a straight stitch or a zigzag stitch upon actuation of said pushbutton.

5. In a zigzag sewing machine according to claim 4, in which said surfaces on said pushbutton for causing said straight or zigzag stitching are peripheral surfaces on said pushbutton positioned on said pushbutton in a position for being rendered effective upon selective angular rotation of said pushbutton, and means mounting said pushbutton for angular positioning thereof and for reciprocable travel upon actuation thereof.

References Cited in the file of this patent

UNITED STATES PATENTS

| 1,341,388 | Smith | May 25, 1920 |
| 2,024,434 | Eames | Dec. 17, 1935 |
| 2,729,178 | Amman | Jan. 3, 1956 |

FOREIGN PATENTS

| 5,224 | Great Britain | of 1894 |
| 535,025 | Italy | Oct. 31, 1955 |
| 564,305 | Italy | June 14, 1957 |
| 558,656 | Belgium | July 15, 1957 |

OTHER REFERENCES

Ser. No. 422,672, W. K. R. Beyer (A.P.C.), published May 11, 1943.